Figures 1, 7:
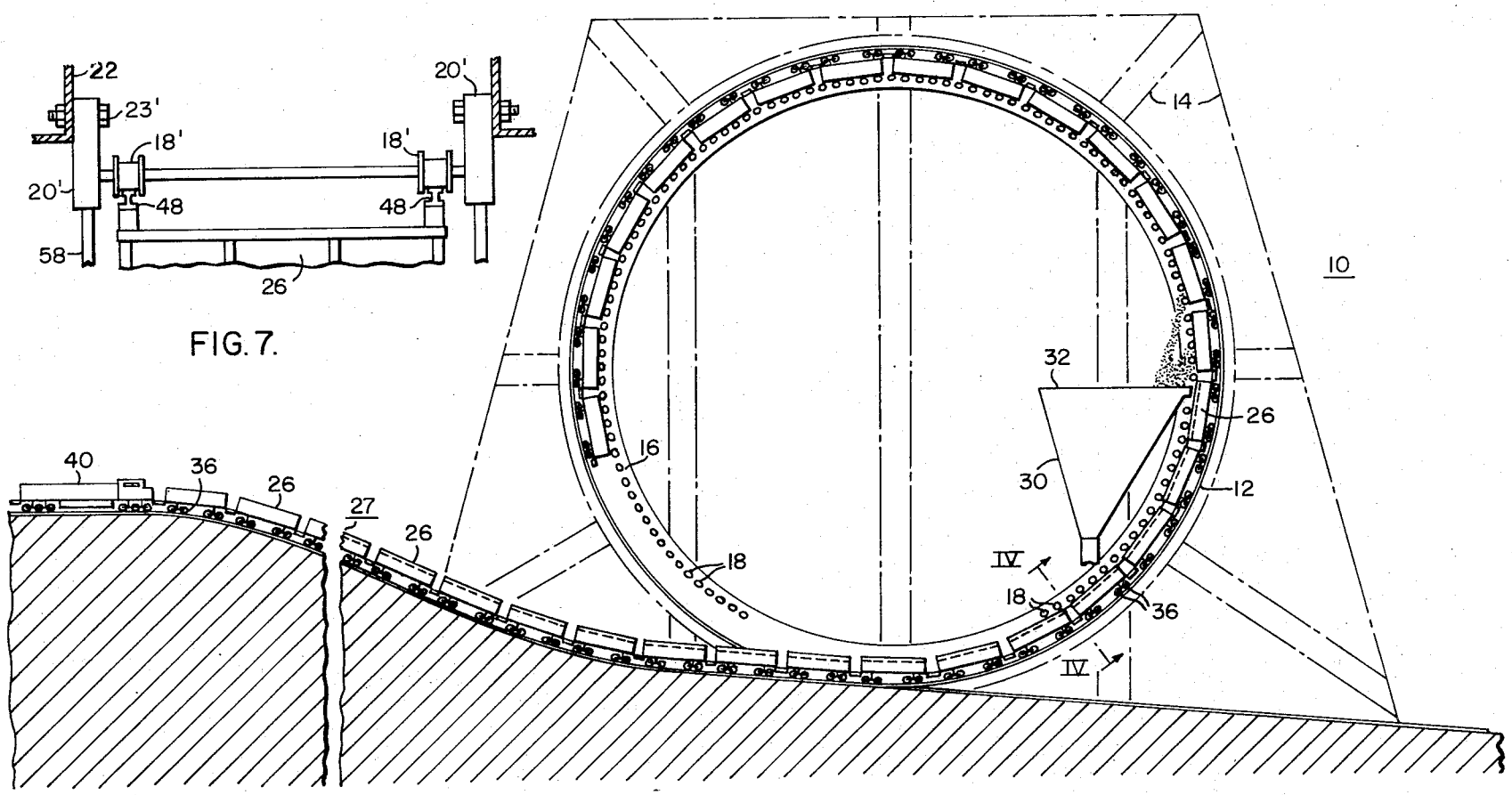
Figure 2:
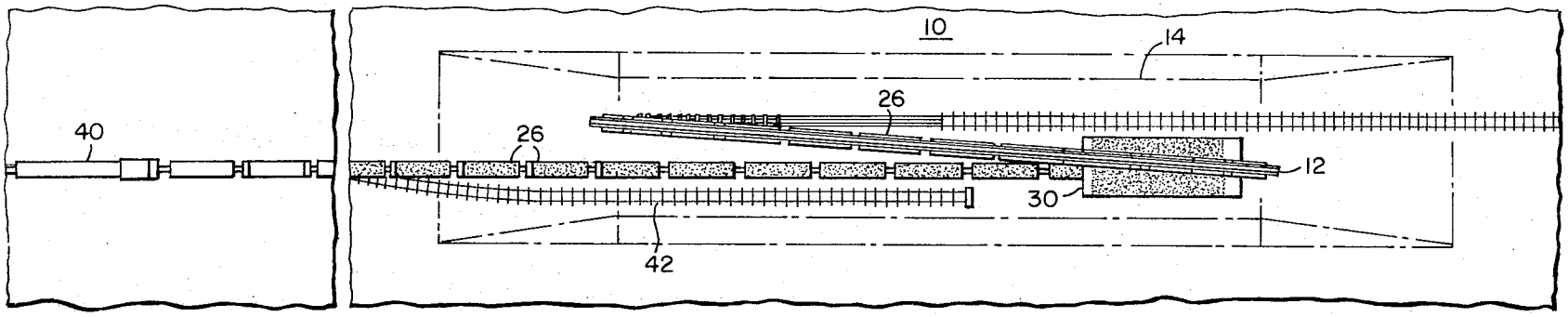
Figure 3:
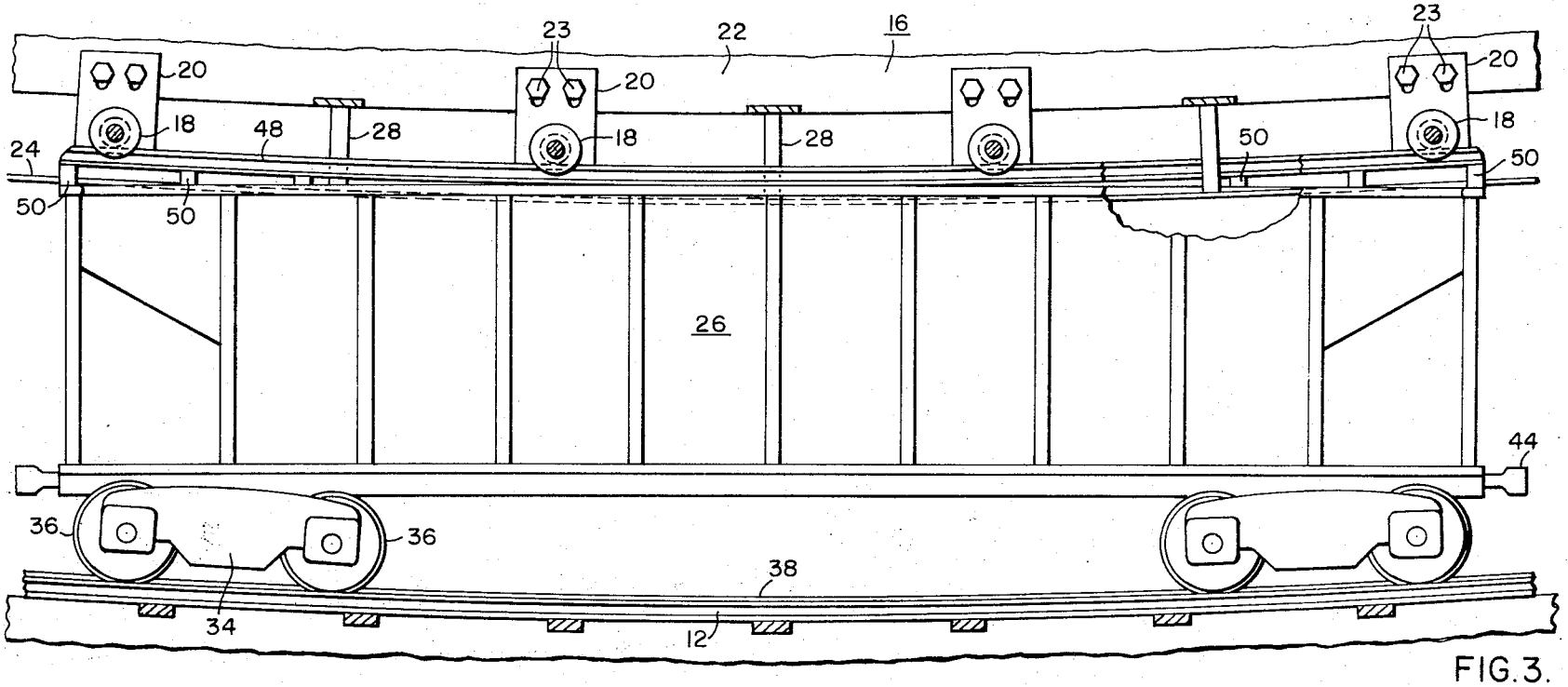
Figure 9:
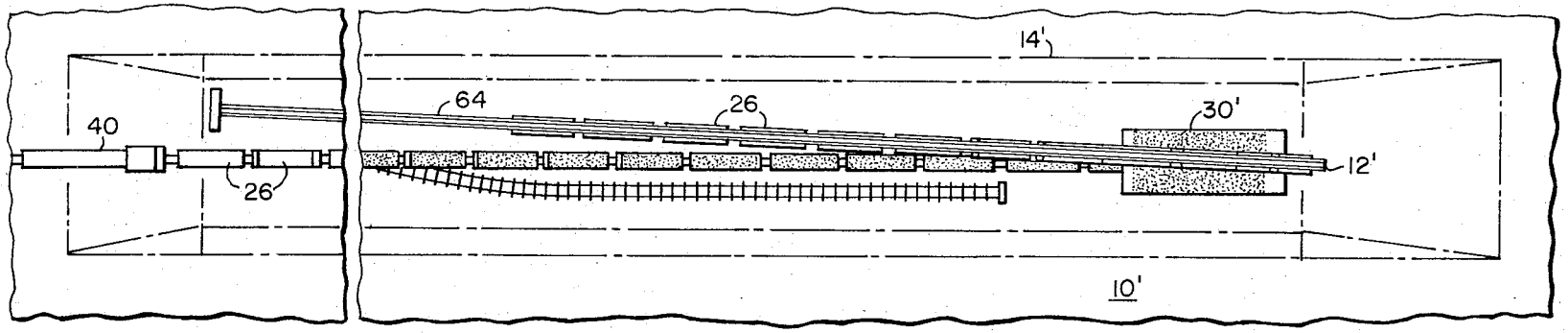
Figure 5:
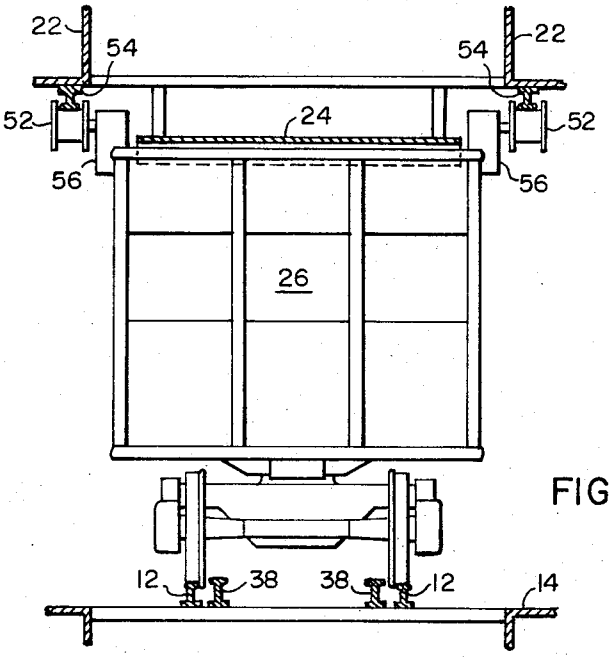
Figure 4:
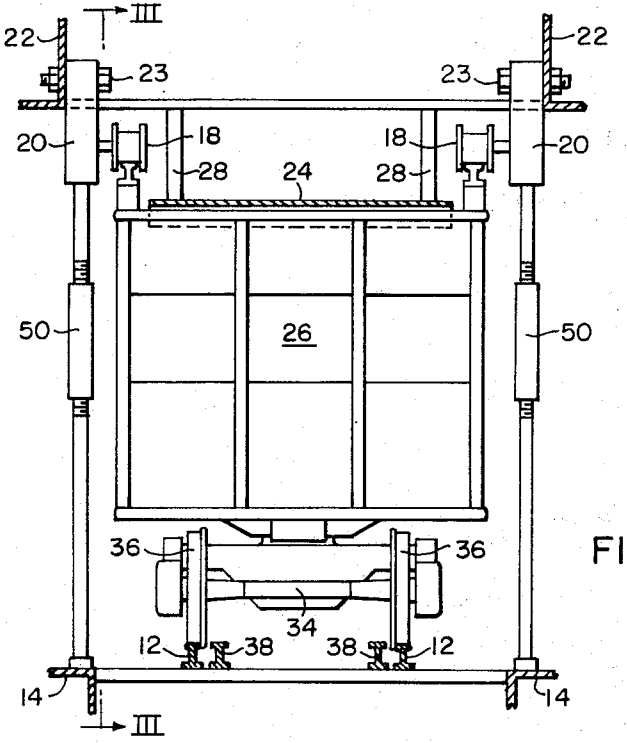
Figure 6:
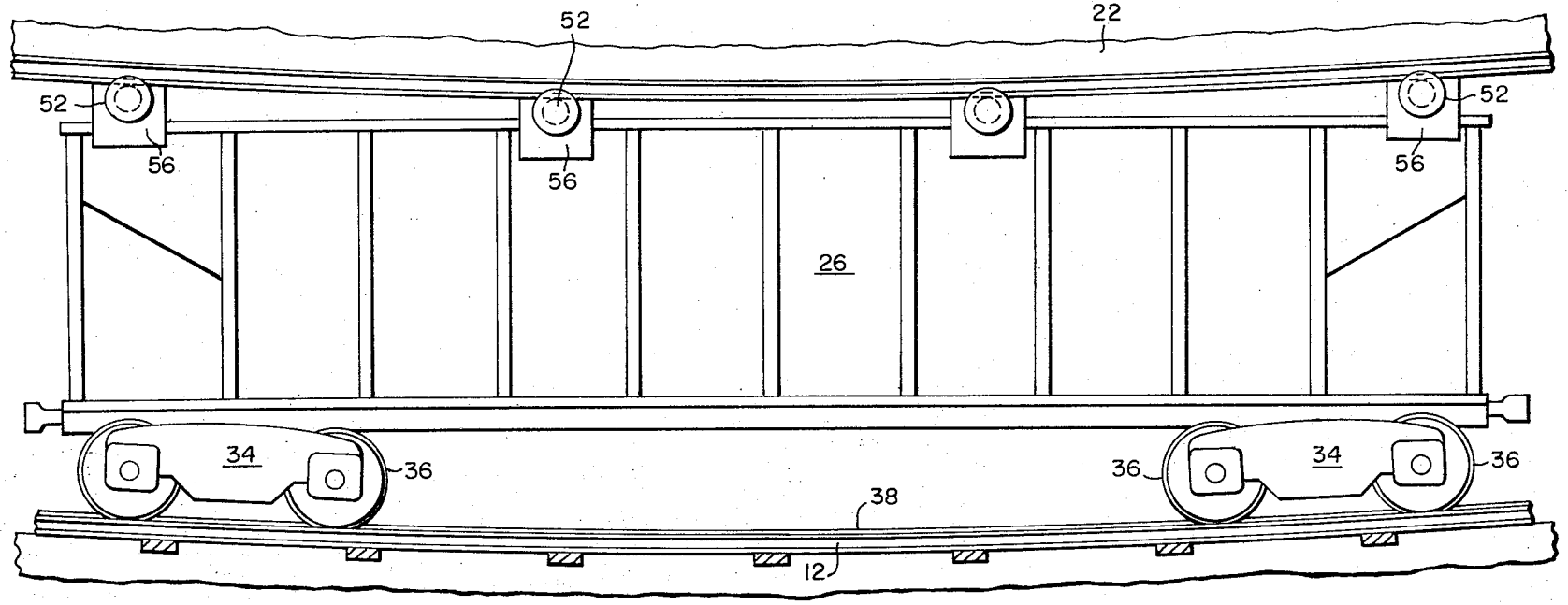
Figure 8:
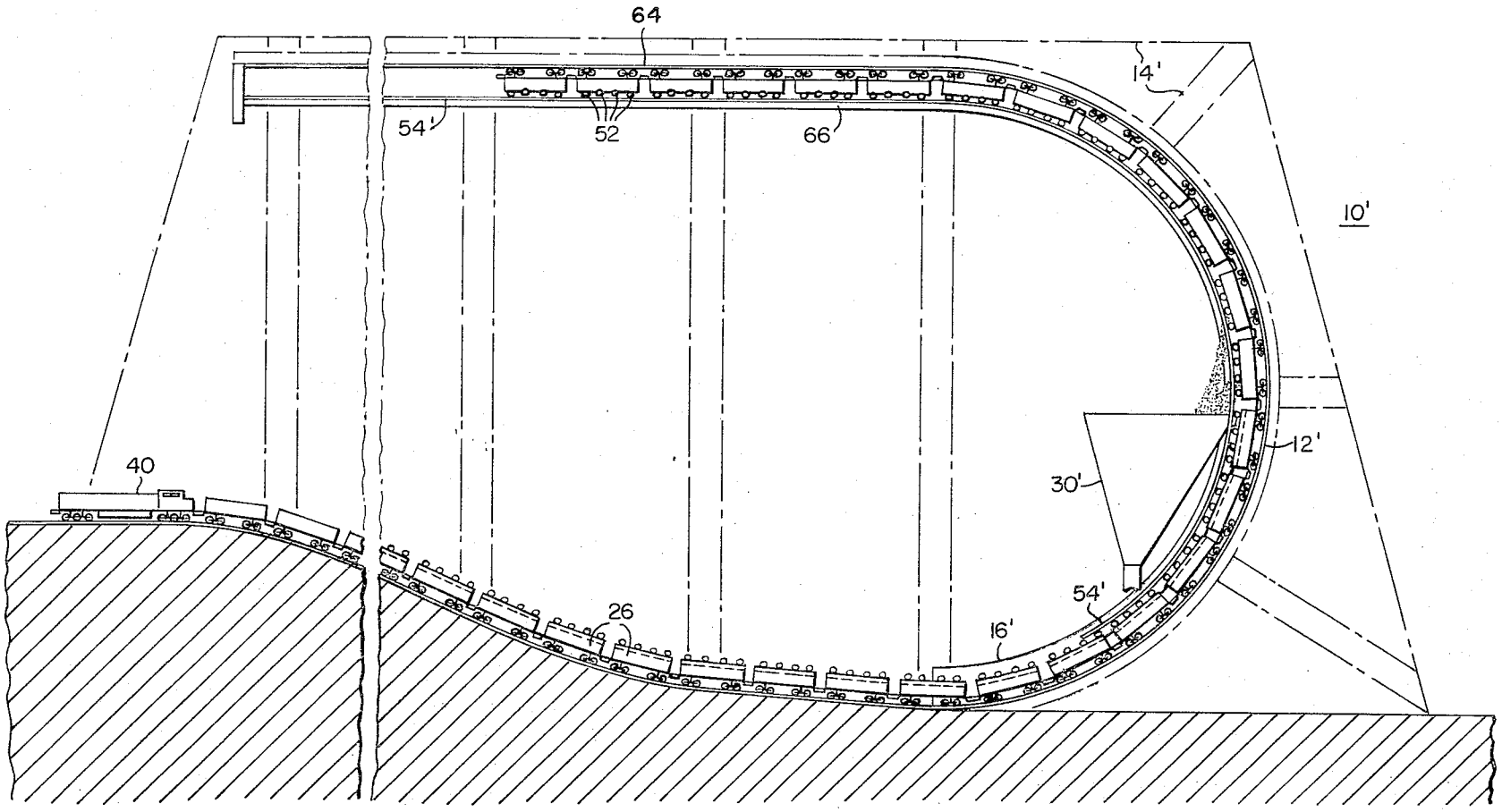

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 7, 1974

922 O.G. 9

T922,002
BULK HAULING FREIGHT CAR UNLOADING APPARATUS AND METHOD OF OPERATION

Paul W. McCormick, 723 Oak St., Johnstown, Pa. 15902

Filed Aug. 13, 1973, Ser. No. 387,804
Int. Cl. B25g *67/34*
U.S. Cl. 214—62 R
5 Sheets Drawing. 8 Pages Specification

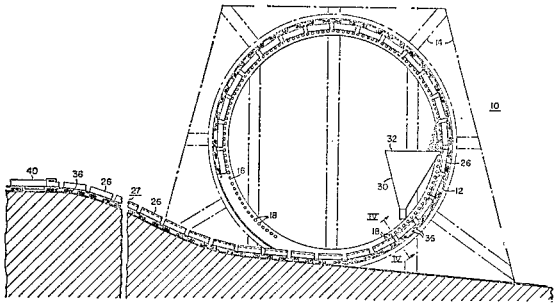

An apparatus for unloading bulk cargo from a train of freight cars of the gondola or hopper type is provided. The unloading apparatus comprises a helical loop of track having a horizontal axis and with a loop extending vertically and positioned such that a train of a large number of open top hopper cars is pushed through the loop in a manner wherein the open tops of the cars always faces the center of the loop while the cars are passing through the loop. A second, inner loop of guide devices is provided to engage the cars adjacent the open end thereof in order to support the cars while they are inverted or partially inverted as they pass through the loop. A load retention device is provided along a portion of the loop to retain the cargo in the cars as the cars are being partially inverted by passing through the loop to prevent premature dumping of the cargo.

In certain embodiments, means are provided for adjusting the distance between the inner and outer loops to accommodate different car sizes.

BULK HAULING FREIGHT CAR UNLOADING APPARATUS AND METHOD OF OPERATION

Filed Aug. 13, 1973 5 Sheets-Sheet 1